United States Patent [19]

Landauer et al.

[11] 4,142,070
[45] Feb. 27, 1979

[54] FALSE FRAMING DETECTOR

[75] Inventors: Steven W. Landauer, Des Plaines; Harry J. Dyke, Oak Forest, both of Ill.

[73] Assignee: Wescom, Inc., Downers Grove, Ill.

[21] Appl. No.: 864,926

[22] Filed: Dec. 27, 1977

[51] Int. Cl.² .......................... H04J 3/06; H04L 7/00
[52] U.S. Cl. ................................ 179/15 BS; 178/69.1
[58] Field of Search .................. 178/69.1; 179/15 BS, 179/15 BA, 15 BY, 15 BV

[56] References Cited

U.S. PATENT DOCUMENTS

| | | | |
|---|---|---|---|
| 3,461,239 | 8/1969 | Widl | 178/69.1 |
| 3,742,139 | 6/1973 | Boehly et al. | 178/69.1 |
| 3,909,540 | 9/1975 | Maryscuk et al. | 179/15 BY |
| 4,002,845 | 1/1977 | Kaul et al. | 179/15 BS |
| 4,010,325 | 3/1977 | Kline | 179/15 BS |

Primary Examiner—Thomas A. Robinson
Attorney, Agent, or Firm—Leydig, Voit, Osann, Mayer & Holt, Ltd.

[57] ABSTRACT

A framing circuit for a pulse code modulated, time multiplexed data receiver provides terminal framing by first detecting a predetermined terminal frame bit code and then checking for false framing by utilizing a false framing detector to count the number of times a particular pattern in a signaling frame bit code occurs. The false framing detector is enabled after terminal framing of the receiver has been accomplished. The false framing detector thereby provides a cross-check between the terminal frame code and the signaling frame code to assure that the receiver has not erroneously framed on a 2 khz interference tone. The cross-check occurs during data reception after terminal framing so that the false frame detector does not delay reframing under ordinary circumstances.

12 Claims, 5 Drawing Figures

Fig. 1.

| FRAME NO. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| TERMINAL FRAME CODE | 1 | | 0 | 0 | 1 | | 0 | | 1 | | 0 | | 1 | | 0 | | 1 | | 0 | | 1 | | 0 | | 1 |
| SIGNALING FRAME CODE | | 0 | | | | $D_1$ | | $D_2$ | | 1 | | 0 | | 0 | | 0 | | $D_1$ | | $D_2$ | | 1 | | 0 | |
| COMBINED CODE | 1 | 0 | 0 | 0 | 1 | $D_1$ | 0 | $D_2$ | 1 | 1 | 0 | 0 | 1 | 0 | 0 | 0 | 1 | $D_1$ | 0 | $D_2$ | 1 | 1 | 0 | 0 | 1 |

Fig. 2.

FALSE FRAMING DETECTOR

BACKGROUND OF THE INVENTION

This invention relates to telephony and more particularly to a receiver for demultiplexing pulse code modulated (PCM) information transmitted over a telephone line.

In general PCM receivers are connected to one end of a telephone transmission line which carries time multiplexed, pulse code modulated information in a continuous serial stream of bipolar pulses. The stream of data pulses or bit stream is generated by sequentially sampling and digitizing a number of analog data channels, usually 24 channels, at the transmitting end of the telephone line. The bit stream is divided into frames consisting of 24 channels, each having an 8-bit channel word for a total of a 192 bits per frame. A 193rd bit or frame bit (also called an "S" bit) is transmitted at the end of each frame and is used to assure that the receiver's demultiplexing circuitry is properly synchronized or framed with respect to the bit stream.

In order to synchronize or frame the receiver, the frame bit (the 193rd bit of each frame) is transmitted in a pre-determined, reoccurring code or pattern such as 11001100 and so one. Conventionally, because of the redundancy of such a reoccurring frame bit pattern, only every other frame bit (referred to as the terminal frame bit) is used to synchronize the receiver, and the alternate frame bit (referred to as the signaling frame bit) is used to identify the one frame in six for which each 8-bit channel word has seven bits of digitized data information and one bit of signaling information, such as dialing information.

In addition to identifying the one frame in six which contains signaling information, some of the signaling frame bits can themelves be used as data bits for transmitting low speed information, such as alarm information.

Having appropriated the signaling frame bit for identifying the signaling frame and in some cases for use as a data bit, prior art PCM receivers are left with only the terminal frame bit (alternate framing bits having a reoccurring 1010 pattern) for establishing framing of the receiver. Because framing in conventional PCM receivers is dependent on the reoccurring 1010 pattern of the terminal frame bit, there exists a likelihood that such receivers will erroneously frame on certain common interference signals which have been induced into the transmission system.

For example, a 2 khz interference signal, which results from the presence of power transmission lines in the immediate vicinity of the data transmission system, can in conventional PCM receivers, induce erroneous or false framing. Because the sequential data sampling rate of the 24 channels at the data transmission end is 8 khz, the sign bit of each 8-bit channel word which results from sampling a 2 khz interference tone varies in a continous pattern of 11001100 and so on. Because the continuous sign bit pattern of the 2 khz interference tone may exist in any one of the 24 channel words throughout the length of a frame, there exists the possibility that the framing circuitry in the receiver might erroneously lock onto the 2 khz tone's sign bit instead of the correct terminal frame bit.

The prior art does not provide a solution to the problem of false framing in the presence of a 2 khz interference tone. For example, U.S. Pat. No. 3,742,139 issued to Boehly et al. discloses using only the terminal frame bit to establish framing. The Boehly system simply compares the terminal frame bit pattern through eight consecutive frames searching for the expected 1010 combination. If the expected bit pattern is present through eight consecutive frames, according to the Boehly patent, there is "little or no chance of false synchronization". The Boehly device, however, could erroneously lock onto a 2 khz interference tone. Such an occurrence would completely disrupt that system's ability to carry data.

U.S. Pat. No. 3,909,540 issued to Maryscuk, et al. provides a two level reframing procedure in which the reframing circuit first checks for the 1010 pattern of the terminal frame bit and then before framing is established, checks for a combination of three consecutive binary 1's for the frame bits in frames 8, 9 and 10. The Maryscuk device, therefore, gives some cross-checking between the terminal frame bit and the signaling frame bit to determine that the framing is proper. The Maryscuk, et al. circuitry might, however, erroneously lock on a 2 khz tone if the data words in frames 8, 9 and 10 after the sign bit for the 2 khz tone happened to have the expected combination of three consecutive "1". Such an occurrence is not altogether unlikely. In any event the framing time required by the Maryscuk, et al. device is significantly increased by the need to locate the three binary 1's in the frame bit pattern before reframing is completed.

It is, therefore, an object of the present invention to overcome the problem of false framing in the presence of a 2 khz interference tone by providing a framing circuit having a false framing detector so that the receiver does not erroneously frame on the sign bit of the 2 khz tone.

It is also an object of the present invention to provide two additional low speed data channels carried via the signaling frame bit while at the same time providing assurance against false framing.

Other objects and advantages will become apparent upon reading the following detail description and upon reference to the drawings, in which.

While the invention will be described in connection with the preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
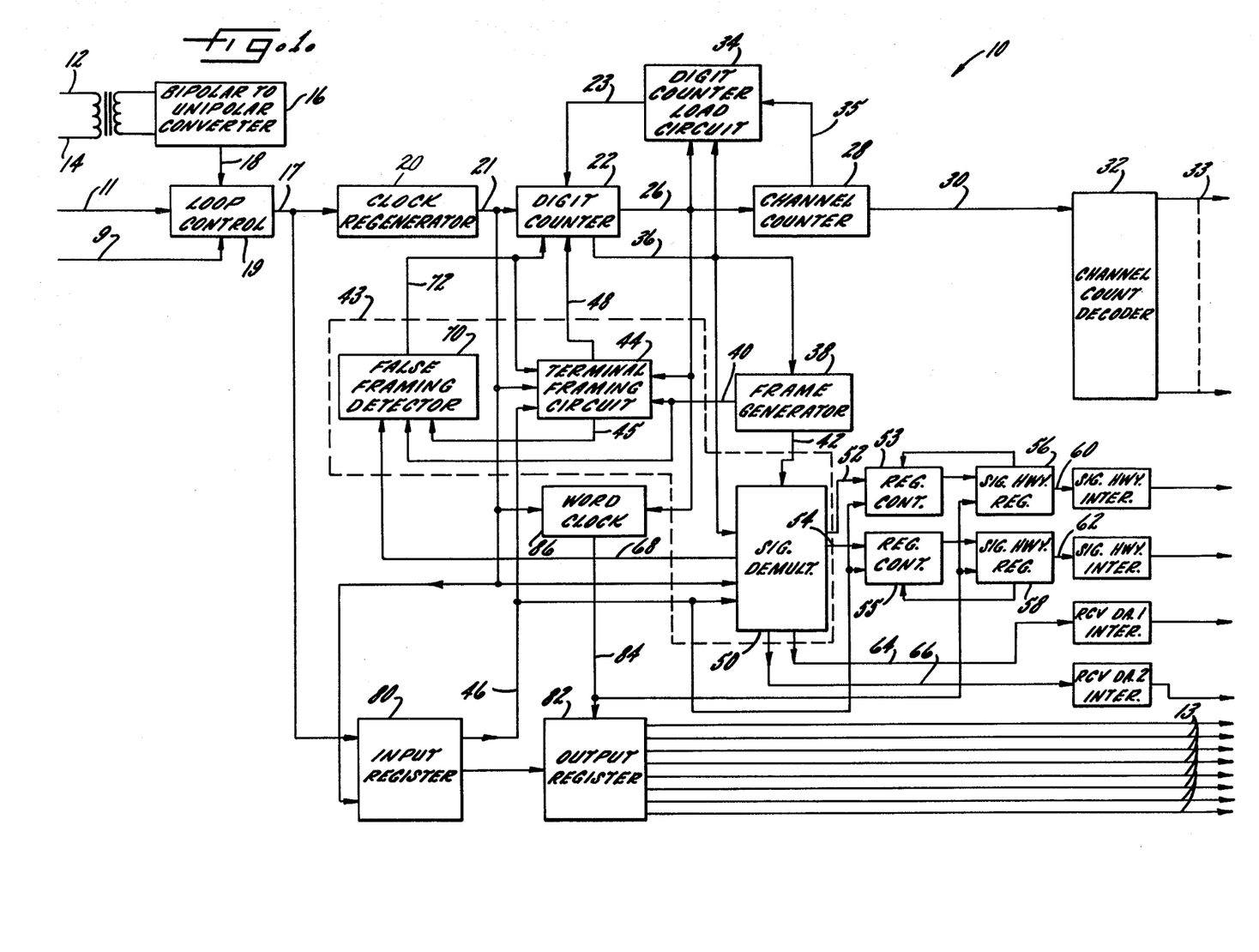
FIG. 1 is a block diagram of a data receiver, demultiplexer for pulse code modulated information which includes a framing circuit consisting of a terminal framing circuit and a false framing detector.

Turning to FIG. 1, a data receiver, such as receiver 10, is used in a telephone system, especially a short haul, heavy route system in congested areas of cities, where a number of analog voice signals are multiplexed onto a single transmission line to save space in underground conduits. In such a system, 24 voice channels are sequentially sampled at an 8 khz rate, and the level of each voice signal on each channel is digitally represented by means of an 8-bit binary number or channel word. The 24 8-bit channel words are then serially fed to a transmission line in the format of bipolar pulses in a continuous bit stream. The presence of a bipolar pulse equals a "1" and the absence of a bipolar pulse equals a "0". Twenty-four channel words (192 bits) comprise a frame in the bit stream, and each frame has an additional 193rd bit or frame bit which is used to synchronize or frame the receiver with respect to the transmitter so that the receiver is able to demultiplex the bit stream and reconstruct the 24 individual voice channels at the receiver's output.

The framing bits are divided into two functions. The odd numbered frame bits (as set forth in FIG. 2), referred to as the terminal frame bits, are used for framing by identifying the reoccurring terminal frame bit code or pattern of 1010 and so forth.

The even numbered frame bits (as set forth in FIG. 2), referred to as the signaling frame bits, are used to identify the one frame out of every six frames in which the least significant bit of the 8-bit channel word is used to carry dialing information instead of all 8 bits being used to encode the amplitude of the voice signal. Also in order to provide as much throughput of information as possible some of the signaling frame bits are used as data bits for carrying low speed information, such as alarm information.

Finally, as will become apparent, the signaling frame bits are also used in the present invention to provide a check to assure that the receiver has not falsely framed such as on the sign bit of a 2 khz interference signal.

Figure 2:
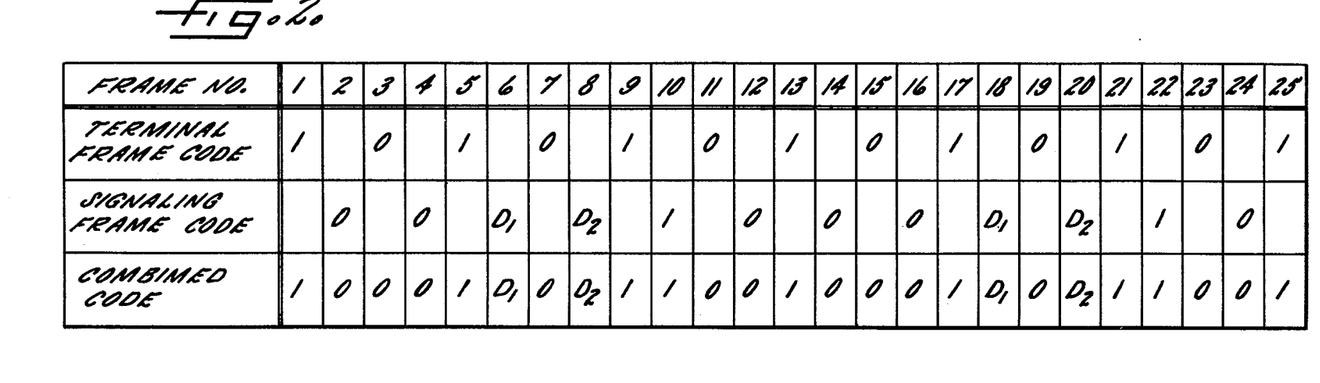
FIG. 2 is a chart showing framing bit patterns for 25 frames of the bit stream.

FIG. 2 shows 25 frames of a combined frame bit code showing the terminal frame bit code and the signaling frame bit code which is used by receiver 10 to provide framing. The framing code is generated by a transmitter in the conventional way and inserted at the 193 bit place in the bit stream. As can be seen, the terminal framing code is a continuously varying pattern of 1010 and so forth. The signaling frame code is selected to provide data bits, $D_1$ and $D_2$, in frames 6, 8, 18, 20 and so forth. The signaling frame bits between the data bits $D_1$ and $D_2$ have a predetermined code of 1000 which is used to identify the one frame (frames 6, 12, 18, 24 and so forth) in every six frames that is the signaling frame and to identify the locations of the two data bits $D_1$ and $D_2$. The 1000 pattern in the signaling frame code is used for cross-checking the terminal framing of the receiver.

Turning again to FIG. 1, a telephone line carrying a bit stream of 24 channels of pulse code modulated data in bipolar format is connected to input terminals 12 and 14 of receiver 10. Bipolar to unipolar converter 16 converts the bipolar bit stream to unipolar logic levels and provides a unipolar bit stream at output line 18 of the bipolar to unipolar converter 16. Loop control 19 provides for reception of unipolar data on input 11 and control input 9 selects either the bit stream on line 18 or the bit stream on line 11 and connects the selected bit stream to output line 17, which is the received bit stream. The bit stream on line 17 is connected to input register 80 which delays the bit stream and provides a delayed bit stream on line 46.

The basic logic timing for the receiver 10 is provided by reconstructing a 1.544 mhz clock signal from the repetition rate of the bit stream. The 1.544 mhz clock rate results from 193 bits per frame multiplied by the 8 khz sampling rate so that each clock pulse corresponds to one bit time (648 nanoseconds). A clock regenerator 20 reconstructs the 1.544 mhz clock signal in the conventional manner and generates the 1.544 mhz clock signal on output line 21 and its complement (on line 121 in FIG. 3 and FIG. 5).

It is necessary to provide a digit count corresponding to each bit within each channel word of the bit stream. A digit counter 22, driven by the 1.544 mhz clock signal on line 21, produces the necessary 8 digit or bit times for each channel word. The digit counter is preset to a count of 8 by a load pulse on line 23. The digit counter then consecutively counts from 8 through 15 and generates a digit counter carry pulse on output line 26. The digit counter carry pulse on line 26 reloads the digit counter by means of digit counter load circuit 34 to the initial count of 8 thereby indicating the beginning of the next 8 bit channel word of the next sequential channel of the bit stream.

A channel counter 28 is provided to count the number of digit counter carry pulses and thus keep track of which channel is being received. The digit counter carry pulse is used to clock channel counter 28. The channel counter produces a channel count on its output 30. The channel count on output 30 is then decoded by channel count decoder 32 to provide sequential, demultiplexing gate signals 33 for each of the 24 channels. The demultiplexing gate signals 33 are used to gate the received data into an appropriate register (not shown) corresponding to each of the 24 channels.

In order to provide for the timing of the frame bit, a count of 193 must be generated by the digit and channel counter. When the channel counter 28 has counted to 24, a channel counter carry pulse is generated on output 35 and is fed to the digit counter load circuit 34. The channel counter carry pulse on line 35 inhibits the digit counter load circuit 34 from reloading the digit counter when the digit counter reaches its full count and a digit counter carry pulse is present on line 26. As a result, the digit counter is allowed to count one extra count or bit time which produces a frame bit timing pulse on line 36. The frame bit timing pulse occurs at a digit count of 193, the 193rd bit time.

In order to separately identify the terminal frame bit and the signaling frame bit, a frame generator 38 selects every other frame bit timing pulse and produces a terminal frame timing pulse on line 40 and a signaling frame timing pulse on line 42.

Receiver framing is accomplished by framing circuit 43 which includes terminal framing circuit 44, signaling demultiplexer 50 and false framing detector 70. Terminal framing is accomplished first, and then after the digit counter has been synchronized, the false framing detector 70 under control of the signaling demultiplexer 50 checks to assure that framing was proper.

Terminal framing is achieved by terminal framing circuit 44 which includes a comparator to compare a locally generated terminal frame bit pattern with the delayed incoming bit stream present on input line 46 of the terminal framing circuit 44. The locally generated terminal frame bit pattern corresponds to the expected pattern of the terminal frame bit. If a favorable comparison is made by the comparator between the locally generated terminal frame bit pattern and the terminal frame bit pattern of the incoming bit stream, no loss of frame signal is produced on line 48 of the terminal framing circuit and the digit counter and channel counter continue counting the bits and channel words of the incoming bit stream.

If, at any time during operation, the comparator of the terminal framing circuit 44 detects an unfavorable comparison between the locally generated terminal frame bit pattern and the terminal frame bit pattern of the incoming bit stream, a loss of frame signal on line 48 stops the digit counter, a frame search signal appears on line 45 and a frame search circuit (part of the terminal framing circuit 44) begins searching for a possible terminal frame bit. Once a possible terminal frame bit is found by the frame search circuit and a favorable comparison is found between the locally generated terminal frame bit pattern and the subsequent terminal frame bits of the incoming bit stream, reframing has tentatively been achieved. Having achieved tentative terminal reframing, the terminal framing circuit 44 removes the loss of frame signal from line 48 which allows the digit counter to resume counting in synchronization with the incoming bit stream. The terminal framing circuit 44, however, remains enabled for eight more frames to assure proper terminal framing.

In the preferred embodiment of the present invention the signaling frame code is used to locate the signaling frame — the one frame in every six which has 7 data bits and 1 signaling bit. In order to locate the signaling frame in the bit stream, the signaling frame timing pulse on line 42 is fed to signaling demultiplexer 50 which decodes the first occurrence of the signaling frame bit pattern 1000 (FIG. 2) in the bit stream and produces a signaling frame enable "A" output on output line 52. The signaling frame enable "A" output occurs during frame 6 in FIG. 2. Six frames after the signaling frame enable "A" output occurs, a signaling enable "B" output occurs on the signaling demultiplexer output line 54. The two signaling frames enable outputs 52 and 54 enable register control circuits 53 and 55 respectively to gate the signaling frame words into signaling highway registers 56 and 58 respectively. During the five interim frames between the signaling frames, the information in the registers is recirculated so that the signaling information contained in the 8th bit of each word in the signaling frame occurs during every frame at the outputs 60 and 62 of signaling highway registers 56 and 58 respectively. The signaling information at register outputs 60 and 62 is used for low speed signaling information such as dialing information and the like.

The signaling demultiplexer 50 also locates the low speed data bits $D_1$ and $D_2$ (FIG. 2) of the signaling frame code occurring in frames 6, 8, 18, 20 and so forth. Again the low speed data bits $D_1$ and $D_2$ are located because of their fixed location with respect to the signaling frame bit pattern of 1000 in the bit stream which is decoded by the signaling demultiplexer 50. Having located the low speed data bits $D_1$ and $D_2$ which are signaling frame bits themselves, the signaling demultiplexer outputs those low speed data bits $D_1$ and $D_2$ onto lines 64 and 66 respectively. These two bits $D_1$ and $D_2$ can be used to carry low speed information such as alarm signals.

Finally, the signaling demultiplexer 50 provides a signaling frame pulse on output line 68 which corresponds to the first occurrence of the 1000 code in the signaling frame. The signaling frame pulse therefore occurs once for every six signal frames in the signaling frame code or once for every 12 frames of the combined code (frames 10, 22 and so forth, FIG. 2).

This signaling frame pulse on line 68 is fed to false framing detector 70. False framing detector 70 has a counter which is initialized every time a frame loss occurs as indicated by a frame search signal on terminal framing circuit output line 45. The false framing detector counter remains initialized until terminal framing has been achieved (eight consecutive good frames after a tentative terminal framing), and then the counter is clocked by every other terminal frame timing pulse which is derived from the terminal frame timing pulse on line 40.

The false framing detector counter is programmed to skip counts every time a signaling frame pulse occurs on line 68 until three signaling frame pulses have occurred with 11 frame intervals between each pulse. At that point, the correct signaling pattern has been achieved and the false framing detector counter stops counting.

If any pattern other than the three signaling frame pulses with 11 intervals appears on line 68, the false framing detector counter is automatically advanced to the full count which generates a carry pulse or a false framing signal on output line 72. The false framing signal clears the digit counter and also enables the terminal framing circuit 44 which begins searching again for the proper terminal frame bit pattern. After terminal framing has been achieved the false framing detector again is activated to check for proper framing.

The signaling frame bit patterns must have the 1000 code once in every 12 frames of the combined framing code. If the receiver should erroneously terminally frame on the sign bit of a 2 khz tone, the receiver will receive random channel word bits instead of the expected signaling frame bits. The 1000 pattern will not appear in these random channel word bits for the requisite number of times, and the false framing will be detected.

When the receiver 10 is operating in frame and receiving data, the bit stream on line 17 is clocked into input register 80 by the 1.544 mhz clock. As soon as all 8 bits of a given channel word are in input register 80, the data is parallel loaded into output register 82 by an output register load pulse from word clock 86 on line 84 and is available on output lines 13. The load pulse on line 84 is generated at word clock 86 by logically summing the digit counter carry pulse on line 26 with the 1.544 mhz clock on line 21.

The 8 parallel bits of data at the output of output register 82 are sequentially clocked into an output register (not shown) by the channel pulse decode outputs 33 in the proper sequence to reconstruct the 24 channels of information.

Having generally described the operation of the data receiver with reference to FIGS. 1 and 2, FIGS. 3, 4 and 5 provide detailed logic schematic diagrams for implementing the inventive concepts previously described.

Figure 3:
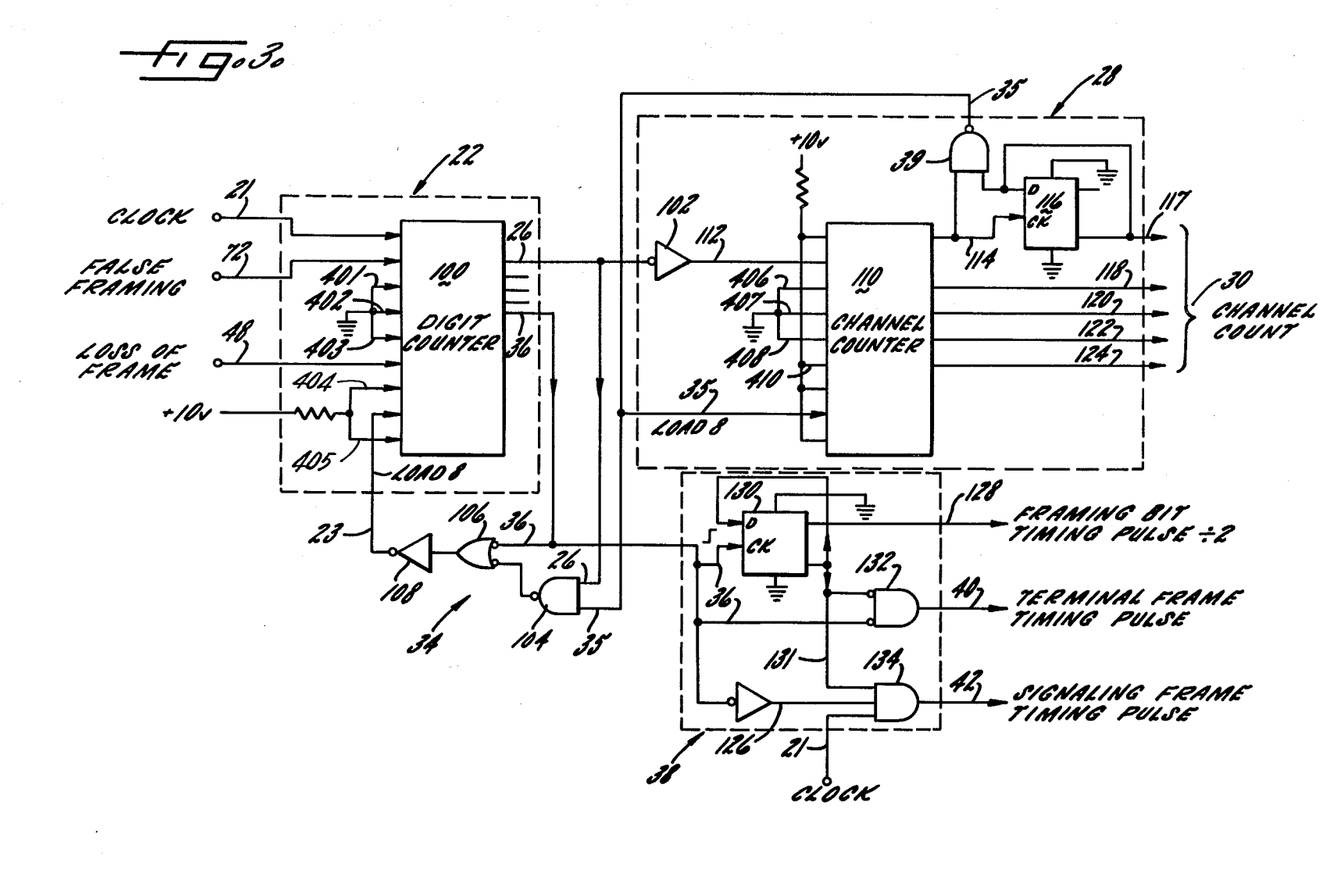
FIG. 3 is a logic schematic diagram of a digit counter, channel counter and associated circuitry used to provide timing signals for the data receiver and particularly for timing in conjunction with the framing circuit.

Turning to FIG. 3, synchronization or framing of the data receiver depends on digit counter 22 and channel counter 28 respectively counting the 8 bits in each channel word and keeping track of the channel word within each frame. The digit counter and the channel counter together provide a count which when decoded routes the channel words within each frame of the incoming data into the proper demultiplexing registers (not shown). The counts 22 and 28 also provide timing signals such as the frame bit timing pulse, the terminal frame timing pulse and the signaling frame timing pulse which signals are necessary to the proper operation of the receiver.

Digit counter 22 comprises a standard, four stage, presettable binary counter 100 (such as a model MN74C161 integrated circuit manufactured by National Semiconductor Corp., Santa Clara, Calif. Data inputs 401, 402 and 403 (401 being the least significant bit) are constant "0"s. The most significant bit input is connected to the frame search signal on line 45 which is normally a "1" when the receiver is in frame. As a result, a load pulse (a "0" pulse) on line 23 presets the counter 100 to a count of 8 (binary 1000). The P and T enable inputs 404 and 405 are held at a constant "1". After being loaded with the initial count of 8, the 1.544 mhz clock signal on clock input line 21 causes the four stage, presettable counter 100 to count from 8 through 15 consecutively and thereby provide a digit count of 8. When the full count of 15 is reached, a digit counter carry pulse (a "1" pulse) is generated on output line 26. The digit counter carry pulse on line 26 is inverted by inverter 102, and the inverted digit counter carry pulse on line 112 is used to clock the channel counter 28. The digit counter carry pulse on line 26 is also connected to digit counter load circuit 34.

Digit counter load circuit 34 comprises gates 104, 106 and 108. In the absence of a channel counter carry signal, a "1" is present on line 35. The "1" on line 35 gates the digit counter carry pulse (line 26) through gate 104, gate 106 and inverter 108 and provides a load pulse (a "0") on line 23. As a result the digit counter 100 is loaded with the initial count of 8 (binary 1000) and proceeds to count the next 8 bit times in the next word channel.

The channel counter 28 consists of a standard, four stage, presettable binary counter 110, and a first pass flip-flop 116 (such as a model CD4013 D-type flip-flop manufactured by National Semiconductor Corp., Santa Clara, Calif.), which operates as a fifth counter stage to provide for a full count of 24 before a channel counter carry pulse is generated on line 35. The counter 110 is loaded with an initial count of 8 (data inputs 406, 407 and 408 are constant "0"s and input 410 is a constant "1"yielding a binary of 1000), by the channel counter carry pulse (a "0" pulse) appearing on line 35 which is the load input to the counter 110. The counter 110 is then clocked by the inverted digit counter carry pulse on line 112.

Counter 110 counts from 8 through 15 and generates a first pass carry signal on line 114. The first pass carry signal, which is the clock input to first pass flip-flop 116, is a "1" which lasts until the next positive going clock edge input to counter 110. First pass flip-flop 116 is initially in a reset condition and the reset output on line 117 is a "1". The first pass carry signal (a "1") on line 114 clocks the "1" on line 117 and sets first pass flip-flop 116. With first pass flip-flop 116 set the resulting "0" on line 117 disables gate 39 so that a "1" is produced on load line 35. Without a channel counter carry pulse (a "0") on line 35 the channel counter is not reloaded with an initial count of 8 by the next clock pulse. Instead counter 110 recycles to a count of 0 and continues after the first pass carry to count from 0 through 15 until a second pass carry pulse is generated on line 114. During the transition of the first pass flip-flop 116 from reset to set, a short negative pulse will occur on line 35, but in the absence of a clock input (line 112) to counter 110 that short pulse will not load the counter 110 with a counter of 8.

As stated, the first pass carry signal on line 114 clocked the "1" on line 117 into the first pass flip-flop 116 and set it. The second pass carry signal (a "1") on line 114 resets flip-flop 116 and produces a "1" on line 117. The "1" on line 37 in conjunction with the second pass carry signal makes NAND gate 39 and produces a negative channel counter carry signal on line 35 which during the next clock pulse loads the channel counter to an initial count of 8. Loading the counter 110 during the subsequent clock pulse also causes the carry output (line 114) to return to "0" which in turn causes the channel counter carry signal on line 35 to return to a "1".

By making two passes through counter 110, a full channel count of 24 is achieved on outputs 118, 120, 122 and 124 of counter 110 and output 117 of first pass flip-flop 116 (collectively line 30 of FIG. 1). The channel count is then decoded to provide the demultiplexing gate signals 33 (FIG. 1).

The channel counter carry signal (a "0") on line 35 is also fed back to the digit counter load circuit 34 and disables gate 104 during the last eight counts of the last channel so that the subsequent digit counter carry pulse (a "1") on line 26 corresponding to a count of 192 does not reload digit counter 100. As a result, digit counter 100 counts one more count from 15 (1111) to 0 (0000) after the digit counter carry pulse and produces an output pulse (a "0" pulse) on line 36 which is the frame bit timing pulse corresponding to the 193rd bit of the 24 channel word frame.

The frame bit timing pulse on line 36 (which is a negative going pulse) is fed through gate 106 and inverter 108 to reload the digit counter 100 with the initial 8 count so that the counting for the subsequent frame can begin. Line 36 is the most significant bit of counter 100's output count. The negative pulse results from the counter counting from 1111 to 0000 and then being loaded with the initial count of 8 (1000).

The digit counter and channel counter are synchronized by a "0" level at the loss of frame input on line 48 of the digit counter 100. The "0" on line 48 (which is the most significant bit of the counter) has the effect of holding the digit counter from generating a carry pulse to clock the channel counter by continuously generating a "0" on line 36 and loading a count of 0000 on every clock pulse until such time as the terminal framing circuit 44 can pick out a possible terminal frame bit. A false framing signal on line 72 indicating that false framing has been discovered operates to clear the digit counter 100 thereby forcing the framing circuit to reframe.

In order to separately use the terminal frame bit and the signaling frame bit for receiver control, the frame bit timing pulse (a "0" pulse) on line 36 and its inverse on line 126 are fed to the frame generator 38 which generates the terminal frame timing pulse (a "1" pulse) on line 40 and the signaling frame time pulse (a "1" pulse) on line 42 which respectively correspond to the location in the bit stream of the terminal frame bit and the signaling frame bit. The frame generator consists of counter 130 (such as a model CD4013, D-type flip-flop manufactured by National Semiconductor Corp., Santa Clara, Calif.) which has its reset output 131 connected in feedback mode to its data input. The frame bit timing pulse on line 36 is the clock input. As a result counter 130 divides the frame bit timing pulse by 2 thereby providing a toggling count on output lines 128 (frame bit timing pulse ÷ 2) and 131. The counter output on line 131 is gated by the frame bit timing pulse (on line 36) into gate 132 to provide the terminal frame timing pulse (a "1" pulse) on line 40.

The signaling frame timing pulse (a "1" pulse) on line 42 is produced at the output of gate 134 by logically summing the clock signal on line 121, the inverse of the frame bit timing pulse on line 126, and the output 131 of counter 130.

Figure 5:
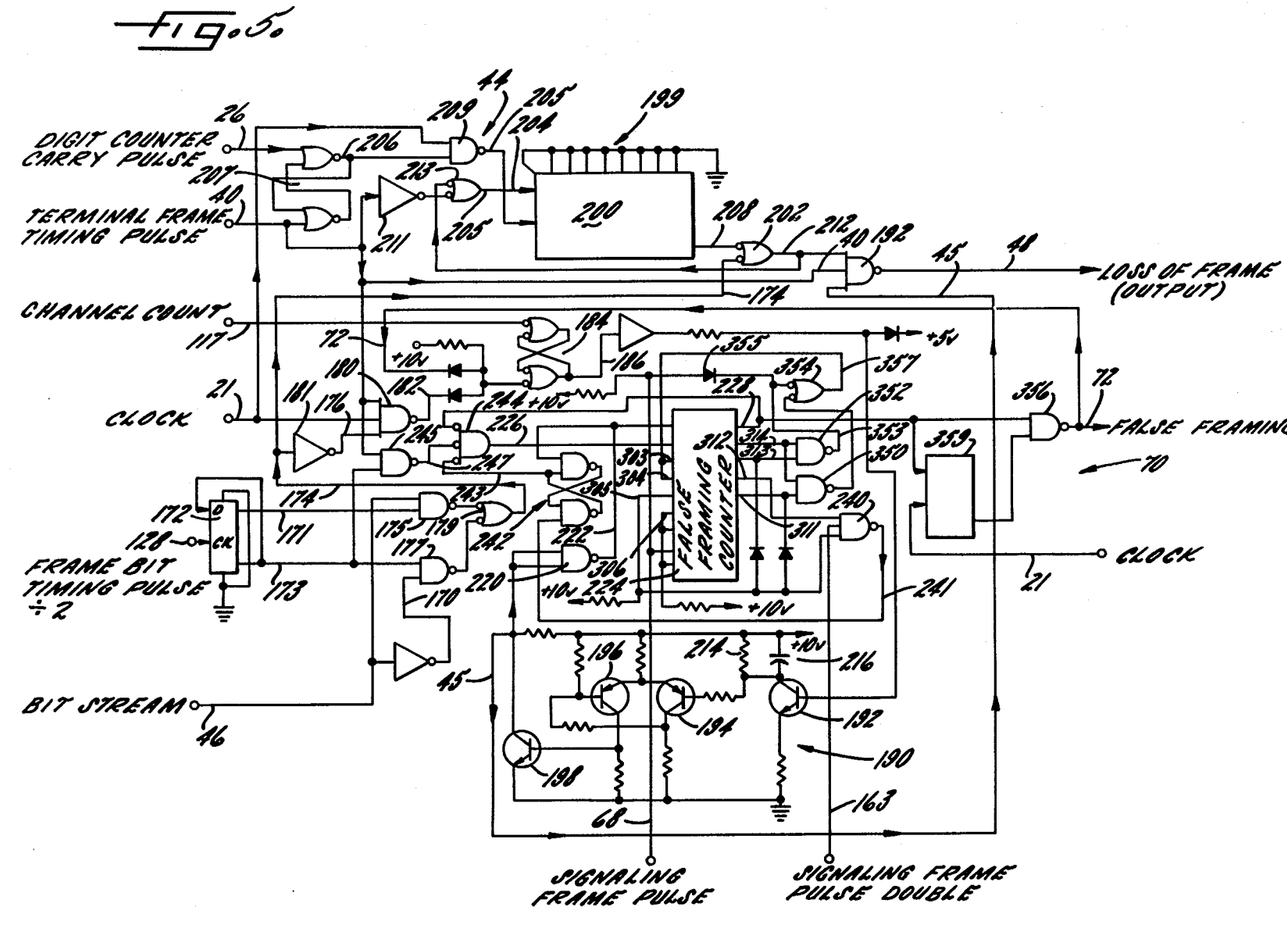
FIG. 5 is a logic schematic diagram of the framing circuit consisting of a terminal framing circuit and the false framing detector.

The terminal framing circuit 44 assures that the terminal frame timing pulse on line 40 and the signaling frame timing pulse on line 42 are in phase with the terminal frame bit and signaling frame bit in the bit stream so there is no need to initialize counter 130 to assure proper phasing. By the same token there is no need to initialize flip-flop 172 (FIG. 5).

Figure 4:
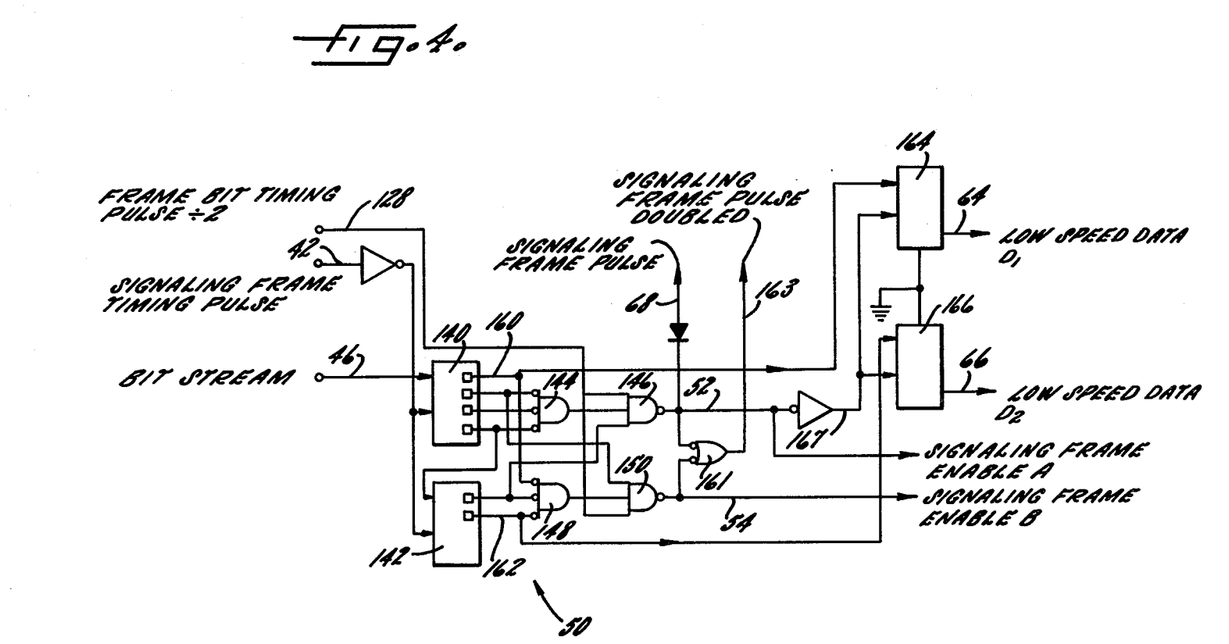
FIG. 4 is a logic schematic diagram of a signaling demultiplexer circuit of the data receiver.

Turning to FIG. 4, the signaling demultiplexer 50 operates in the following manner to locate and provide gating signals for the signaling frame, to locate the signaling frame bits which are themselves to be used as data bits and to generate the signaling frame pulse which controls the operations of the false framing detector.

The signaling frame time pulse on line 42, which appears in synchronization with each signaling frame, clocks the signaling frame bits of the delayed bit stream on line 46 into shift registers 140 and 142 (FIG. 4). The outputs of the shift registers 140 and 142 are decoded by gates 144, 146, 148 and 150. Gates 144 and 146 decode the 1000 pattern of the signaling frame bits when that pattern first appears at the shift registers' outputs and the end of the frame 16, for example (FIG. 2) and a "1" on line 128, which last for the duration of frame 17 (FIG. 2), enables gate 146 to produce a negative going signaling frame enable "A" pulse on line 52. Six frames later (frame 22) gates 148 and 150 decode the 1000 signaling frame pattern again, and a "1" on line 128 of frame 23 enables gate 150 to produce the signaling frame enable "B" output on line 54.

The signaling frame enable "A" pulse also serves as the signaling frame pulse on line 68 which is used to condition the count of the false framing detector. The signaling frame enable "A" and signaling frame enable "B" are logically combined by gate 161 to produce a signaling frame pulse doubled (line 163) which is also used as a timing signal in the false framing detector 70.

The two signaling frame enable outputs "A" and "B" on lines 52 and 54 respectively are used to gate signaling data contained in the signaling frame words into the signaling highway registers 56 and 58 (FIG. 1).

The data bits $D_1$ and $D_2$, which are signaling frame bits for frames 6 and 8 (FIG. 2), are recovered from output lines 160 and 162 respectively of the shift registers 140 and 142 by clocking the signaling frame bits on lines 160 and 162 into registers (D-type flip-flops) 164 and 166 respectively with the inverse of the signaling frame enable "A" pulse (on line 167). The data $D_1$ and $D_2$ is available at the reset outputs of registers 164 and 166 on lines 64 and 66 respectively.

Finally turning to FIG. 5, the terminal framing circuit 44 and the false framing detector 70 operate to first establish framing by means of the terminal framing circuit and subsequently check the framing with the false framing detector.

Terminal framing is constantly checked by comparing a locally generated terminal frame bit pattern with the expected terminal frame bit pattern of the incoming bit stream. If the comparison is not proper, a terminal frame search is initiated until a proper comparison is achieved.

In order to facilitate comparison, the terminal frame bit pattern in the bit stream of 1010 is first converted to all "0"s so that comparison is accomplished by a single gate comparator 180 which is disabled by all "0"s of the converted bit stream. The conversion of the terminal frame bit pattern to all "0"s is accomplished by first generating gating pulses 2 frames positive and 2 frames negative. These gating pulses are generated by dividing the frame bit timing pulse on line 40 by 4 by means of counters 130 (FIG. 3) which produces frame bit timing pulse divided by 2 on line 128 as previously described. The signal on line 128 is used as the clock pulse for counter (D-type flip-flop with feed back connection) 172 (FIG. 5) which divides by 2 again to produce complementary gating pulses on lines 171 and 173 each being 2 frames positive and two frames negative. These gating pulses then gate the delayed bit stream on line 46 and inverted bit stream on line 170 through NAND gates 175 and 177 respectively. The resulting outputs are combined by gate 179 to produce a gated bit stream on line 174 which is 2 frames of bit stream followed by 2 bits of inverted bit stream and so forth.

If the terminal framing pattern exists in the bit stream, all the terminal frame bits will have been converted to "1"s in the converted bit stream on line 174 and after passing through inverter 181 to all "0"s on the line 176. The converted bit stream on line 176 (the terminal frame bits are all "0" if framing is proper) is fed to comparator 180 (a NAND gate) where the converted bit stream is sampled during the terminal frame time by a positive clock pulse on line 121 and the terminal frame timing pulse (a "1" pulse) on line 40.

As long as the terminal framing pattern exists in the bit stream and the terminal frame bits are all "9"s on line 176, comparator 180 will be disabled during the terminal frame time, and a "1" will result on line 182 which indicates that the receiver is in frame.

The "1" output on line 182 indicating that the receiver is in frame is connected to the reset side of loss of frame flip-flop 184. The loss of frame flip-flop 184 is initialized by a "0" set pulse, which occurs during the second part of each frame, on line 117 from first pass flip-flop 116 of channel counter 28. The "0" pulse on line 117 lasts for the latter part of each channel time, and line 117 returns to a "1" prior to the occurrence of the terminal frame timing pulse on line 40 and the clock pulse on line 121 at the input of comparator 180. The "1" output from comparator 180 (the receiver is in frame) will not reset loss of frame flip-flop 184, and a "0" will remain on line 186. The "0" output on line 186 is connected to the loss of frame integrator 190 consisting of transistor 192 (normally off), transistor 194 (normally off), transistor 196 (normally on), and transistor 198 (normally on). With transistor 198 on, frame search signal on line 45 remains a "0", and the receiver is in frame.

gate 192 which produces a "1" for the loss of frame signal (indicating no loss of frame) on line 48. A "1" for the loss of frame signal is connected to the most significant bit input of the digit counter 100 (FIG. 3). The "1" on line 45 indicates to the digit counter that the data receiver is in frame and allows the digit counter to load an initial count of 8 (1000) and continue in its normal operation.

If a loss of frame does occur and one of the terminal frame bits in the bit stream is other than that of the expected 1010 pattern, a "0" will appear in the converted bit stream on line 174 and a "1" will appear on line 176 during the terminal frame time. The "0" in the converted bit stream on line 174, indicating a bad terminal frame bit, is connected to comparator 180 and to gate 202 producing a "1" on line 212. When the converted bit stream is sampled by the terminal frame timing pulse on line 40 and the clock on line 212, comparator 180 will provide a "0" output which will reset loss of frame flip-flop 184. As a result of resetting the loss of frame flip-flop 184, the loss of frame integrator 190 will change states after as small delay so that a "1" produced for the frame search signal on line 45 will not coincide with the terminal frame timing pulse on line 40 at gate 192 until the next terminal frame time. Therefore, a single isolated error in the terminal frame pattern will be ignored. The "1" on line 45, in conjunction with the "1" on line 212 and the next terminal frame timing pulse on line 40, will enable gate 192 and produce a "0" for the loss of frame signal on line 48. A "0" on line 48 will hold the digit counter at a count of zero by continuously loading a zero count. Enabling gate 192 and stopping the digit counter will enable frame search circuit 199 consisting of shift register 200, flip-flop 207 and gates 209, 213, 202 and 192.

The search circuit 199 operates in the following manner. Shift register 200 is a standard 8-bit static shift register such as model CD4014 manufactured by National Semiconductor Corp., Santa Clara, Calif. Input data is connected to the serial data input 204 of the register, and a clock signal is provided on input 205 to shift the data. The parallel inputs and the parallel/serial control input are all ground to a "0" state so that the input data on line 204 is shifted to the output, line 208, by eight clock pulses on line 205.

The clock to the register is controlled by flip-flop 207. The reset output, line 206, of flip-flop 207 controls NAND gate 209 which in turn gates the 1.544 mhz clock on line 121 to shift register 200. During normal in frame operation flip-flop 207 is reset by every digit counter carry pulse on line 26. The reset condition of flip-flop 207 disables gate 209 and inhibits a clock pulse to the register. Flip-flop 207 is set by terminal frame timing pulse 40 and remains set until the first digit counter carry pulse on line 26 so that eight clock pulses on line 121 are provided to the shift register between the terminal frame bit time the next seven digit counts. The shift register therefore receives eight clock pulses for every two frames of received data. The first clock pulse during the terminal frame time shifts a "1" into the shift register which is the terminal frame timing pulses fed through inverter 211 and gate 213 to input 204. The next seven clock pulses then shift in 7 bits from line 212 (inverted on line 204) each of which represents a comparison between each of the first seven bits of data after the terminal frame bit and each of the seven bits following the previous terminal frame bit. As a result, during the last seven clock pulses, the register 200 stores a "1" if the corresponding bits in consecutive terminal frames exhibited an alternating pattern which is characteristic of a terminal framing bit.

When the receiver loses framing and a "1" on line 45 initiates a search, the "0" on line 48 stops the digit counter after the terminal frame timing pulse (line 40) has set flip-flop 207, and no digit counter carry pulse (line 26) can reset flip-flop 207 until tentative terminal framing has been achieved and the digit counter is restarted. Therefore during terminal reframing the serial data at input 204 is shifted into register 200 on every clock pulse on line 121 which corresponds to every bit time for the incoming bit stream.

In order to terminally reframe, a search comparison signal on ine 212 (and therefore inverted on 204) represents a comparison of the first 7 bits of data after the selected terminal frame bit of the previous frame which has been stored in the shift register 200 (a "1" was stored during normal operation if corresponding bits in consecutive frames exhibited the alternating frame pattern) and the first 7 bits of new data after the selected terminal frame bit.

If a stored bit on output line 208 of shift register 200 is a "0" or if a new bit in the gated bit stream on line 174 is a "0", gate 202 produces a "1" output on line 212 which enables gate 192 and produces a "0" output on loss of frame line 48. As a result the digit counter is held at a 0 count, and the stored bit is not a possible terminal framing bit. Having not found a possible terminal framing bit, the next clock pulse on line 205 shifts in the next bit of the search comparison signal on line 212 and another comparison is made between the stored bit on line 208 and the new bit in the converted bit stream on line 174. The grame search circuit 199 thus continues searching for a possible terminal framing bit until both the stored bit on line 208 and the new bit on line 174 are "1"'s.

If a stored bit is a "1" on line 208, the output of the shift register 200, and the new bit is a "1" in the converted bit stream on line 174, a "0" at output 212 of gate 202, disables gate 192 producing a "1" on the loss of frame input on line 48 thereby indicating that a possible terminal frame has been found. The "1" on line 48 allows the digit counter to load a count of 8 (1000) and begin counting.

After the digit counter resumes counting the loss of frame flip-flop 184 is set (no loss of frame) by channel count signal on line 117 from the channel counter's first pass flip-flop 116. Setting the loss of frame flip-flop reactivates the comparator 180 and also feeds a "0" on line 186 to the loss of frame integrator 190. However, the RC time constant of capacitor 216 and resistor 214 holds the loss of frame integrator circuit 190 in its changed state (with a "1" on line 45 indicating that the terminal frame search should continue) for approximately 16 frames after the loss of frame flip-flop 184 is set. As a result, gate 192 of the frame search circuit 199 will continue enabled for at least 8 terminal frames after the first favorable comparison is made by gate 202 of the frame search circuit 199.

After terminal framing has been completed (after 8 consecutive frames of a favorable terminal frame bit comparison) and the loss of frame integrator 190 returns to its normal state with line 45 returning to its normal "0" state. The "0" on line 45 is inverted by gate 220 to produce a "1" on line 222 which enables the false framing detector 70. The false framing detector 70 insures that the true framing occurred by looking at the signaling frame pulse on line 68 and verifying that the signal frame pulse occurs every 12th frame for a minimum of 25 frames at which time the false framing detector becomes disabled and no longer functions until terminal reframing occurs again.

The false framing detector includes false framing detector counter 224 which is a 4 stage binary counter (identical in construction to counters 100 and 110) that is cleared and held by a "0" on line 222 every time a frame loss occurs and while line 45 is a "1". Counter 224 has a clock input on line 226 and a load input on line 68.

Counter 224 also has data inputs on line 303, 304, 305 and 306 (306 being the most significant bit) and corresponding count outputs 314, 313, 312 and 311 (311 being the most significant bit). A carry output is generated on line 228. The counter 224 initially has a count of 1000 at its inputs 306, 305, 304 and 303 respectively and a 0000 count at its outputs 311, 312, 313 and 314 respectively as a result of the clear pulse ("0") on line 222. The clear pulse on line 222 also serves to set counter clock flip-flop 242 to provide an enabling "0" on line 243 to clock gate 244. The clear pulse on line 222 also causes the carry output on line 228 to be a "0" thereby providing a second enabling "0" to clock gate 244.

The clock for the counter 224 is generated by summing the terminal frame timing pulse on line 40 with the frame bit timing pulse divided by 4 on line 173 by means of NAND gate 245, the output of which is connected to the third input 247 of clock gate 244. The resulting positive pulse clock on line 226 to counter 224 occurs for every other terminal frame timing pulse. Therefore, the clock pulse for the counter occurs for every fourth frame of received data (2 khz rate).

While the clear condition exists, the clock on line 226 has no effect on counter 224. As soon as terminal framing has been achieved and a "1" appears on line 222, the false framing detector counter begins counting as it is clocked by every other terminal frame timing pulse on line 226.

Outputs 311, 312, 313 and 314 (314 being the least significant bit) record the count of counter 224 in binary form. After 8 frames (2 counts on line 226) of received data, an output count of 0010 is reached. Gates 350, 352 and 354 decode the output count of 0010 to provide an input count of 1000 on lines 306, 305, 304 and 303.

If the receiver is properly framed and before the next clock pulse to the counter occurs, the pattern of 1000 in the signaling frame code (FIG. 2) is decoded, and a negative going signaling frame pulse occurs on line 68. When the next clock pulse occurs at the input to counter 224 on line 226, that clock pulse in conjunction with the signaling frame pulse on line 68 (a load pulse for the counter 224) synchronously loads the input count into the counter, and the count 1000 immediately appears at the output of the counter.

If the load pulse on line 68 had occurred prior to the count reaching 0010, at a count of 0001 for example, the result would have been exactly the same in that the count 1000 would have been loaded and transferred during the next clock pulse.

After the initializing count of 1000 has been loaded and transferred to the output of the counter 224, 8 more frames (2 clock pulses) advances the count from 1000 to 1010. The output count of 1010 is decoded to produce an input count of 1100 which count, in the presence of a load pulse from line 68 (indicating that the receiver is still properly in frame), is loaded and transferred during the next clock pulse.

After another 8 frames (2 clock pulses) the output count reaches 1110, which is decoded by gate 240. Gate 240 is strobed by the signaling frame pulse doubled signal on line 163 to produce a reset pulse on line 241 for flip-flop 242, which in turn disables the clock to the counter 224. At that point in time the false frame counter 224 stops, and the receiver has been determined to have not falsely framed because the proper number of properly spaced signaling frame pulses on line 68 were received by the counter 224.

If during the 25 frames of information that occur after line 222 becomes a "1", the signaling frame pulse on line 68 is absent or the signaling frame pulse on line 68 occurs more frequently than every 12 frames, the counter 224 will detect false framing and generate a carry output on line 228.

In the case where the signaling frame pulse is absent altogether, the counter 124 will begin counting as soon as line 222 becomes a "1". After the output count has reached 0011 (and no load pulse has previously occurred on line 68), gate 352 will produce a "0" output on line 353 which will simultaneously produce a "1" on output 357 of gate 354 and a load pulse on line 68 by means of diode 355. The load pulse will at the next clock pulse load a count of 1011. The output count of 1011 produces another "0" on line 353 which in turn produces another load pulse by means of diode 355. This load pulse at the next clock pulse loads in a count of 1111 producing a carry output (a "1") on line 228. The carry output on line 228 inhibits the clock pulse on line 226 by disabling gate 244. The carry output is also fed to gate 356 and D-type flip-flop 359 which together produce a "0" pulse on line 72 indicating that the receiver was falsely framed. The "0" pulse on line 72 is also fed to flip-flop 184 which is then reset indicating that a frame search should begin.

Finally there is also the case in which the signaling frame pulse on line 68 occurs more frequently than it should thereby indicating that framing was falsely accomplished. In that case, by way of example, it will be assumed that an extra signaling frame pulse occurs simultaneously with the second count after the first proper load and transfer has occurred (count 1000 loaded). As a result, an output count of only 1001 for the counter 224 is reached instead of 1010 before the signaling frame pulse occurs. That count (1001) is decoded by gates 350, 352 and 354 to produce an input count of 1011, which count is loaded into the counter during the next clock pulse in conjunction with the extra signaling frame pulse. The count 1011 produces a "0" output on line 353 of gate 352 which in turn provides a load pulse by means of diode 355. ON the next clock pulse the full count is loaded, and a carry results which indicates false framing.

Therefore, unless the signal frame pattern of 1000 appears (and produces a signaling frame pulse on line 68) once every 12 frames for 25 frames with 11 frame intervals, counter 224 will advance to its full count and indicate false framing. Such a false framing detector assures that terminal framing on a 2 khz noise signal's sign bits will be discovered. If the receiver does terminally frame on a 2 khz noise signal, the bits of the 2 khz noise signal which occur during the signaling frame time will also be sign bits of the 2 khz noise signal with a pattern of 010101. Obviously the signaling demultiplexer 50 would never decode the 1000 signaling frame code so no signaling frame pulse on line 68 would be generated. Without a signaling frame pulse on line 68, the counter 224 will generate load pulses on line 353 through diode 355 and a full count and carry will result. The carry on line 228 will initiate a terminal framing search, and the receiver will not continue terminally framed on the erroneous 2 khz noise signal.

In summation, proper framing of the receiver depends on the fact that the terminal frame bit pattern (1, 0, 1, 0, etc.) repeats every four [Y] frames of received data bits, and the signaling frame bit pattern (1, 0, 0, 0, D1, D2, etc.) repeats every twelve [X] frames of received data bits. Because the patterns of signaling frame bits and terminal frame bits repeat in predictable fashion, framing is accomplished by first generating a terminal frame timing pulse having a period of 2T and a signaling frame timing pulse displaced by 180° and having a period of 2T, where T is the period of a single frame of received data having 193 bit times. The repetition rate for the terminal frame bit pattern can be considered in a generalized sense as repeating every Y frames while the signaling frame bit pattern repeats every X frames, where X is greater than Y.

Second, the receiver shifts the phase of the terminal frame timing pulses relative to the received data bits by holding the digit counter (and as a result the channel counter) during a terminal frame search until the terminal frame timing pulses coincide with received data bits which have the terminal frame bit pattern (1, 0, 1, 0, etc.).

Third, the receiver produces a control signal, which is the signaling frame pulse on line 68 when the last six received data bits, which are spaced by 2T and coincide with the signaling frame timing pulse, exhibit the signaling frame bit pattern (1, 0, 0, 0, D1, D2, etc.). The control signal, could be produced more often such as the signal on line 163 so that a general expression for the period of the control signal would be 2T (6 signaling frames)/n, where n is an integer.

Fourth, the receiver by means of the false framing counter 224 determines whether the control signal occurs once and only once for every 6/n (or X/n) occurrences of the signaling frame timing pulse.

Finally, if the control signal occurs in the wrong frequency, steps two through four above are repeated until step four indicates the proper occurrences of the control signal.

It should also be kept in mind that the repetition frequency of the terminal frame bit pattern and the signaling frame bit pattern can be changed so that each repeats more or less often as long as the repetition rate of the terminal frame bit pattern is greater (i.e., number of frames is less) than the signaling frame bit pattern.

The control signal also gates the signaling bits and the data bits D1, D2 into holding devices, register control circuits 53 and 55 and output registers 164 and 166, and in that way allows the receiver to recognize and use the data bits for low speed signaling, such as alarm signals.

We claim:

1. In a pulse code modulated, time multiplexed data receiver for receiving a serially transmitted bit stream of data bits divided into channel words and frames with alternate frames characterized by a terminal frame bit and signaling frame bit, which receiver includes digit and channel counter means for counting the data bits and channel words within each frame and adapted to be synchronized with the frame of the transmitted bit stream, a framing circuit comprising:
    (a) a terminal framing circuit including means for locally generating a terminal frame bit pattern, a comparator for comparing the locally generated terminal frame bit pattern with a predetermined pattern of the terminal frame bits of the bit stream and searching means enabled by the comparator to search for a terminal frame bit and to synchronize the digit and channel counter means with the frames of the transmitted bit stream;
    (b) a signaling demultiplexer including decoding means for locating occurrences of a predetermined pattern of signaling frame bits; and
    (c) a false framing detector enabled by the terminal framing circuit after the searching means has found a terminal frame bit and operably connected to the decoding means of the signaling demultiplexer to count the occurrences of the predetermined pattern of the signaling frame bits to assure the receiver has been properly synchronized with the frame of the bit stream.

2. The framing circuit of claim 1, wherein the decoding means includes register means for locating and storing certain data carrying signaling frame bits which are separate from the predetermined pattern of signaling frame bits.

3. The framing circuit of claim 1, wherein the decoding means further includes gating means for locating and gating signaling frame words into signaling registers.

4. The framing circuit of claim 1, wherein the terminal framing circuit includes timing means interposed between the comparator and the search means to keep the search means enabled for a predetermined time after the comparator enables the search means to assure that a proper terminal frame bit has been found.

5. The framing circuit of claim 4, wherein the search means further includes a shift register for selecting bits in serial fashion for comparison with corresponding bits in subsequent frames prior to synchronizing the digit and channel counter means.

6. The framing circuit of claim 4, wherein the timing means is connected to the false framing detector to assure that the false framing detector is enabled after the search means has found a proper terminal frame bit.

7. The framing circuit of claim 6, wherein the false framing detector includes a counter which counts the occurrences of the predetermined pattern of signaling frame bits for a predetermined number of frames after being activated.

8. In a pulse code modulated, time multiplexed data receiver wherein successive frames of multiple multibit channel words are received in time sequence with terminal and signaling frames alternating in time, the terminal frames containing a terminal frame bit appearing in a first pattern spanning a predetermined number Y of terminal frames and the signaling frames containing a signaling frame bit appearing in a second repetitive pattern spanning a predetermined number X of signaling frames, where X is greater than Y, said frames having a period T, said terminal frame bits having a period 2T, and said signaling frame bits having a period 2T, the method of synchronizing the receiver comprising
    (a) locally generating terminal frame timing pulses with a repetition period of 2T and coincident with instants at which bits are received,
    (b) locally generating signaling frame timing pulses with a repetition period of 2T and coincident with the instants at which bits are received, said signaling frame timing pulses being always 180° phase displaced relative to said terminal frame timing pulses,
    (c) changing the phase of the terminal frame timing pulses relative to a received stream of data bits until the terminal frame timing pulses appear in coincidence with received data bits, spaced by the period 2T, which exhibit said first pattern.
    (d) producing a control signal when the last-received X bits spaced by the period 2T and coincident with the signaling frame timing pulses, exhibit said second pattern, said control signal having a period of 2XT/n, where n is an integer, (e) after the completion of said step (c), determining whether one and only one control signal thereafter occurs for every X/n occurrences of said terminal frame timing pulse, and (f) in the absence of an affirmative determination in step (e), repeating said steps (c), (d) and (e), thereby to eliminate false synchronization on a spurious first pattern appearing in the received bits, other than in the terminal frame bits, which are spaced by one frame time from the signaling frame bits.

9. The method set forth in claim 8 wherein said step (d) is continuously performed so that said control signal appears as a periodic signal with a period of 2XT/n, and said control signal is employed to gate certain ones of the bits in every Xth/n frame into holding devices.

10. In a pulse code modulated, time multiplexed data receiver wherein successive frames of multiple multi-bit channel words are received in time sequence with terminal and signaling frames alternating in time, the terminal frames containing a terminal frame bit normally appearing in a 010101 pattern and the signaling frames containing a signaling frame bit normally appearing in a repetitive pattern spanning a predetermined number X of signaling frames, said frames having a period T and containing N bit times, said terminal frame bits having a period 2T, said signaling frame bits having a period of 2T, and said repetitive pattern appearing repetitively with a period of 2XT, the method of synchronizing the bit signal receiver comprising (a) clocking tandem digit and channel counters, having a repetitive count cycle of N bit time counts, with clock pulses timed to coincide with the successive instants of received data bits to produce terminal frame timing pulses and signaling frame timing pulses, said terminal frame timing pulses and signaling frame timing pulses being interleaved with one another and each having a period of 2T, (b) adjusting said counters to change the phase of the terminal frame timing pulses relative to received data bits until the terminal frame timing pulses appear in coincidence with received data bits, spaced by 2N bit times, exhibiting a 010101 bit pattern over a predetermined number of terminal frames, (c) storing the values of the last-received X bits which arrive in synchronism with said signaling frame timing pulses and producing a control signal during those intervals when the stored values exhibit said repetitive pattern, (d) upon the completion of said step (b), determining whether one and only one control signal occurs for every X occurrences of said terminal frame timing pulse, and (e) in the absence of an affirmative determination in step (d), repeating said steps (b) and (d).

11. The method set forth in claim 10 wherein said determining step (d) is carried out until a predetermined number of terminal frame timing pulses have occurred.

12. In a pulse code modulated, time multiplexed data receiver wherein successive frames of successive channel words of successive binary bit signals are received, with terminal frames and signaling frames alternating in time, the terminal frames containing a terminal frame bit normally appearing in a first repetitive pattern spanning a predetermined number Y of terminal frames and the signaling frames containing a signaling frame bit normally appearing in a second repetitive pattern spanning a predetermined number X of signal frames, said frames having a period T and containing N bit times, with each channel word occupying $N - 1/C$ bit times where C is the number of channels, the terminal frame bits having a period 2T, and the signaling frame bits having a period 2T but phased 180° in time from the terminal frame terminal bits, the combination comprising (a) means for locally generating clock pulses coincident with the received data bit times, (b) means for counting said clock pulses with a count cycle of N to produce channel gating signals and terminal frame timing pulses having a period of 2T and signal frame timing pulses having a period 2T but constantly phased by 180° in time from said terminal frame timing pulses, (c) means for adjusting said counting means to change the phase of the count cycle relative to the received data bit times until the terminal frame timing pulses appear in coincidence with received data bits, arriving with a time spacing of 2N bit times, exhibiting said first repetitive pattern, whereupon the channel gating signals are tentatively framed, (d) means for producing a control signal when the last-received X bits, received in coincidence with said signaling frame timing pulses, exhibit said second pattern, (e) means for producing a false framing signal unless one and only one control signal occurs within the time span that a quantity X of said terminal frame timing pulses occur, and (f) means responsive to said false framing signal for reinitiating the operation of said means (c), whereby false framing upon a spurious first pattern in received bit signals, other than in the received terminal frame terminal bit signals, is avoided.

* * * * *